United States Patent [19]
Iba

[11] Patent Number: 5,384,654
[45] Date of Patent: Jan. 24, 1995

[54] IMAGE OBSERVATION DEVICE
[75] Inventor: Yoichi Iba, Hachiouji, Japan
[73] Assignee: Olympus Optical Co., Ltd., Tokyo, Japan
[21] Appl. No.: 58,266
[22] Filed: May 10, 1993
[51] Int. Cl.⁶ .................. G02B 23/00; G02B 17/00
[52] U.S. Cl. .................. 359/364; 359/630; 359/631; 359/740
[58] Field of Search ............ 359/630, 631, 362, 364, 359/641, 643, 663, 708, 738, 740, 557, 496

[56] References Cited

U.S. PATENT DOCUMENTS

| | | | |
|---|---|---|---|
| 3,940,204 | 2/1976 | Withrington | 359/618 |
| 4,632,503 | 12/1986 | Karlsson | 359/217 |
| 4,761,056 | 8/1988 | Evans et al. | 359/361 |
| 4,859,030 | 8/1989 | Rotier | 359/631 |
| 4,878,046 | 10/1989 | Smith | 359/630 |
| 4,968,123 | 11/1990 | Fournier, Jr. et al. | 359/630 |
| 5,000,544 | 3/1991 | Staveley | 359/630 |

FOREIGN PATENT DOCUMENTS

| | | | |
|---|---|---|---|
| 0007039 | 1/1980 | European Pat. Off. | 359/630 |
| 000531121 | 3/1993 | European Pat. Off. | 359/630 |
| 62-214782 | 9/1987 | Japan . | |
| 9104508 | 4/1991 | WIPO | 359/630 |

Primary Examiner—Eugene R. LaRoche
Assistant Examiner—Tan Nguyen
Attorney, Agent, or Firm—Cushman, Darby & Cushman

[57] ABSTRACT

An image observation device includes a two-dimensional image display element, a relay optical system for forming a real image of an image displayed on the two-dimensional image display element, an eyepiece optical system for forming a magnified image of the real image and bending the optical axis, and a supporting member for supporting the eyepiece optical system to be located directly before the eyes of the user. This arrangement makes it possible to provide the image observation device which is small in size and high in magnification for observation.

17 Claims, 5 Drawing Sheets

IMAGE OBSERVATION DEVICE

BACKGROUND OF THE INVENTION

1. Field of the Invention

This invention relates to an image observation device which is handy to carry, and more particularly to an image observation device which can be held on the head or face of an observer.

2. Description of the Related Art

Figure 1:
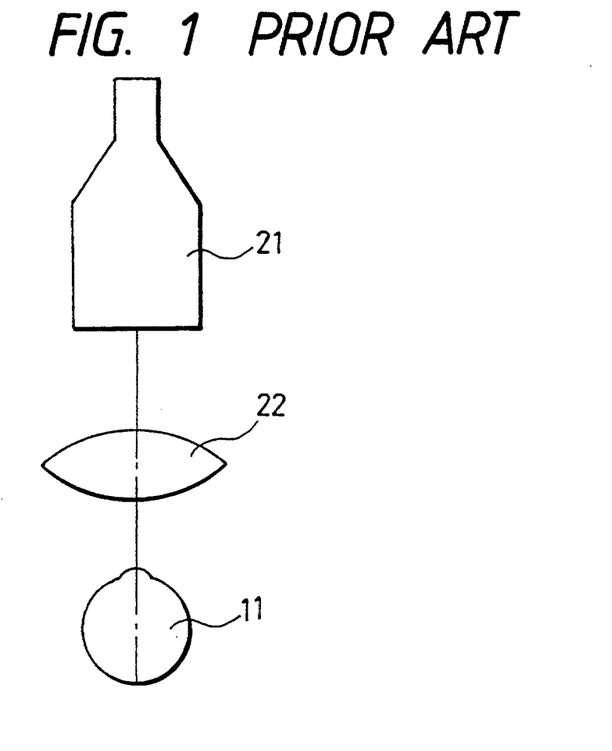
FIG. 1 is a plan view showing the arrangement of essential parts of a head-mounting image observation device of the prior art.
Figure 2:
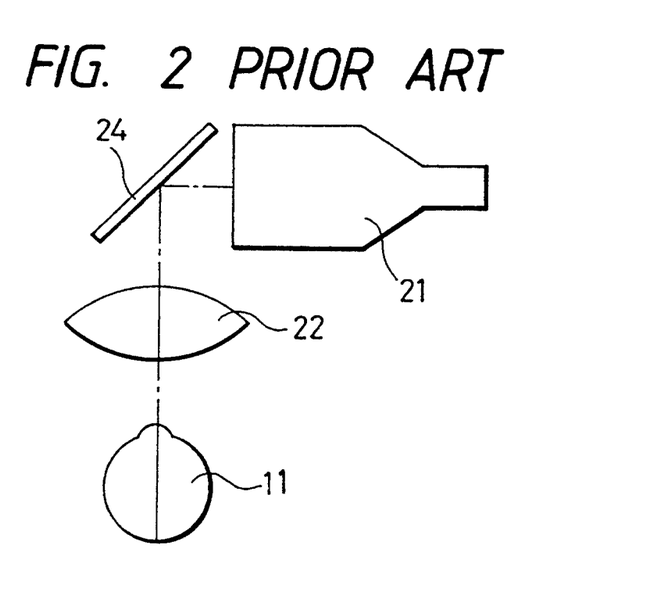
FIG. 2 is a plan view showing the arrangement of essential parts of another image observation device of the prior art.

In the past, a conventional image observation device such as that set forth in Japanese Patent Preliminary Publication No. Sho 62-214782 has been known. FIG. 1 shows a conventional unit constructed so that a two-dimensional display element 21 is magnified and observed with an eyepiece 22, and supported in front of an eye 11 by supporting means not shown. FIG. 2 shows another conventional unit in which a plane mirror 24 is inserted between the two-dimensional display element 21 and the eyepiece 22 to bend its optical axis.

For the example depicted in FIG. 1, the two-dimensional display element 21 and the eyepiece 22 are arranged in a straight line. Thus, the device, when mounted on the head of the observer, protrudes a considerable amount from his face, giving rise to a situation which causes a disagreeable sensation to the observer. The weight of the entire device will be carried at the supporting point of his face or head and the considerable amount of protrusion of the device from his face increases the distance from the supporting point to the center of gravity in a horizontal direction, thus causing a great moment. Moreover, because the weight of the entire device is added to the supporting polar, the stability of the mounting is not secured, and there is a fear that the device may strike upon something when the observer walks or shakes his head.

In another example shown in FIG. 2, designed so that the optical axis Is bent, the entire device also considerably protrudes because of the plane mirror 24 obliquely placed as well as the thickness of the eyepiece 22. Furthermore, in this arrangement, when a virtual image is created to magnify and observe an image displayed on the two-dimensional display element 21 through the eyepiece 22, it is necessary to dispose the two-dimensional display element 21 closer to the eyepiece 22 than the object focal point of the eyepiece 22. As such, the insertion of the plane mirror 24 between the two-dimensional element 21 and the eyepiece 22 causes an increase of the optical distance between them, and hence the focal length of the eyepiece 22 must be increased accordingly. Furthermore, since the magnification of the eyepiece is inversely proportional to its focal length, this arrangement cannot bring about high magnification. It follows from this that the user observes a substantially small picture. As mentioned above, the two-dimensional display element itself has been observed directly through the eyepiece in the past to avoid mechanical interference with the plane mirror by the placement of the eyepiece. Consequently, the image observation device of the prior art has the defect that the magnification of the eyepiece cannot be increased.

SUMMARY OF THE INVENTION

It is, therefore, an object of the present invention to provide an image observation device which is small in size and high in magnification for observation.

The image observation device according to the present invention includes two-dimensional image display means, a relay optical system for forming in space a real image of the image displayed on the two-dimensional image display means, an eyepiece optical system for forming a magnified virtual image of the real image and bending the optical axis, and supporting means for supporting the eyepiece optical system so that it is located directly before the eye of the user.

In the preceding arrangement, the user does not directly observe the image displayed on the two-dimensional image display means through the eyepiece optical system, but rather views a spatial image, of the image once displayed on the two-dimensional display element, formed by the relay optical system, through the eyepiece optical system. The spatial image and the eyepiece optical system can thus be arbitrarily approached without mechanical interference. If, therefore, the spatial image is formed at a position suitable to a desired magnification for observation, a large-sized, impressive picture can be viewed. Additionally, because the eyepiece optical system is such that the optical axis is bent, the image observation device becomes small in size.

In the present invention, an aspherical reflecting mirror whose concave surface is directed toward the eye of the user can be used as the eyepiece optical system. In this case, it is favorable that the aspherical reflecting mirror is practically configured as a spheroid. The supporting means supports the reflecting mirror so that one of two focal points of the reflecting mirror is positioned in the vicinity of the pupil of the eye of the user, or near the central point of rotation of the eyeball, or between them.

Furthermore, an aperture stop is provided for restricting the beam diameter of light emitted from the two-dimensional image display means. The supporting means supports the aperture stop, the relay optical system, and the eyepiece optical system so that the real image of the aperture stop produced by an optical system disposed between the aperture stop and the eye of the user is located in the vicinity of the pupil of the eye, or near the central point of rotation of the eyeball, or between them.

As mentioned above, the use of the concave mirror directed toward the eye of the observer as the eyepiece optical system makes it possible to provide a single reflecting surface with the behavior of forming a magnified image and of bending the optical axis. Consequently, the image observation device can be reduced to a smaller size. In this instance, if the reflecting mirror is taken as an aspherical surface, the aberration of the image for the large-sized picture of a large field angle can be favorably corrected by the single reflecting mirror. However, if the numerical aperture (hereinafter abbreviated to NA) where the real image is formed by the relay optical system is large, the image may become unclear because the aberration cannot be sufficiently corrected.

Figure 3:
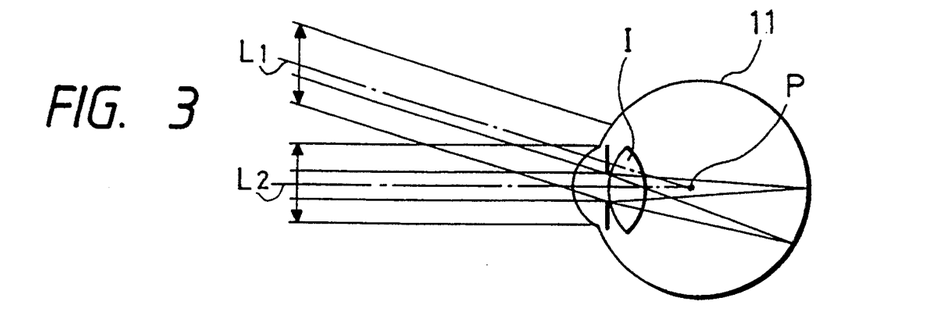
FIGS. 3 and 4 are views for explaining the function of an image observation device according to the present invention.
Figure 4:
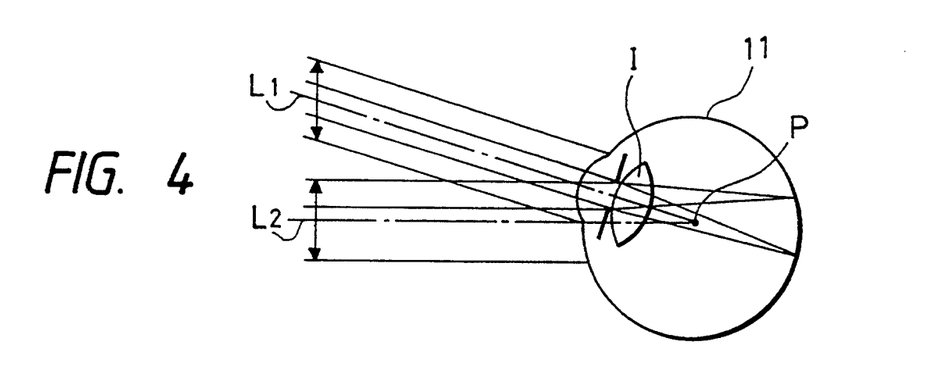

In the present invention, the purpose of placing the aperture stop in the optical path is to solve such problems. The NA of the light beam is limited to a proper extent to suppress the generation of spherical aberration, thus preventing the deterioration of picture quality. The aperture stop is available, for example, in the inner edge of a frame supporting a lens. Furthermore, the restriction of the NA of the light beam at the emission point of a light source brings about the same result as in the placement of the aperture stop. Viewed from the user side, the aperture stop acts as an exit pupil for the entire observation system. Hence, in order to prevent the eclipse of the image, it is necessary to determine the arrangement of optical constituent elements so that the pupil of the eye of the user coincides with the exit pupil.

Where the exit pupil is relatively large, it is only necessary to establish the positional relationship between the exit pupil and the eye as described below. FIGS. 3 and 4 show the states where the light beam is incident on the eye of the user. Reference numeral 11 denotes again the section of the eyeball, symbol I denotes the pupil (iris), P denotes the central point of rotation of the eyeball, and L1 and L2 denote the principal rays of on-axis and off-axis light beams emerging from the observation device. In these diagrams, since the exit pupil coincides with the central point of rotation P of the eyeball 11, the light beams L1 and L2 are incident toward the central point of rotation P of the eyeball 11. Thus, even when the line of sight follows another direction, the eyeball 11 rotates about the central point of rotation P, so that the principal ray of the light beam incident from that direction passes through the center of the pupil I. In other words, the light beams passing through the pupil I are those with the principal rays L1 and L2 as centers and adjacent thereto. In general, spherical aberration and coma are small in the vicinity of the principal ray and are larger at the margin of the beam. By causing the exit pupil to coincide with the central point of rotation as stated above, the picture can be observed with the light beam around the principal ray providing small aberration in any direction the line of sight follows. Even where the diameter of the exit pupil is made large and correction for aberration is insufficient for the entire beam, a sharp picture can be observed if aberration in the middle of the light beam is fairly corrected. Even though a proper beam diameter is not obtained, the above effect is in some extent brought about by the placement of the exit pupil between the central point of rotation P and the pupil I.

In the case of a wide field angle at which the image observation device provides a large-sized picture in particular, the NA of the exit pupil increases and spherical aberration is liable to occur. In this case, a concave mirror will profit from approximating a spheroidal mirror (spheroidal concave mirror) by making use of the properties that the spheroidal mirror has two elliptic focal points conjugate with each other and is free from (spherical) aberration. If a part functioning as a substantial aperture stop in the device is disposed adjacent to one of the two elliptic focal points, the exit pupil having little aberration will be formed at the other focal point.

In order to reduce the degree of the protrusion of the entire device from the face of the user, it is only necessary to bend the optical axis along his face. Because the face can be regarded as a moderate convex surface, the relay optical system is caused to have the function of bending the optical axis along the face, thereby reducing the degree of the protrusion of the device. The method of providing such a bending function is to use a wedge-shaped prism, for instance. Alternatively, the relay optical system having the behavior of a lens is decentered from the optical axis and thereby can easily be provided with the bending function. In this case, by properly restricting the translation operation distance and inclination of the optical axis, the optical system has the advantage of bringing about the effect of correction for aberration as well as the bending function. Specifically, although there is aberration produced by tilting the concave mirror having a positive power with respect to the optical axis, the aberration of this kind cannot be corrected by a coaxial optical system. However, the proper decentering of the relay optical system makes it possible to reduce the aberration.

Summarizing the above description, the image displayed on the two-dimensional display element is projected as the real image in space by the relay optical system. Furthermore, the image is magnified and projected as the virtual image at a proper distance where the user can easily view the image through the concave mirror. These components are connected by the supporting means and carried by the head or face of the user at a supporting point. Thus, the user can observe the magnified picture of the two-dimensional display element, without holding the device with his hand, or without suffering inconvenience from the shake of his head.

In the present invention, the optical axis means an axis which coincides with a ray of light emerging from the center of the two-dimensional image display means and passing through the center of the pupil of the eye of the user or of the aperture stop, namely with an axial principal ray.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

In accordance with the embodiments shown, the image observation device of the present invention will be explained in detail below.

Figure 5A:
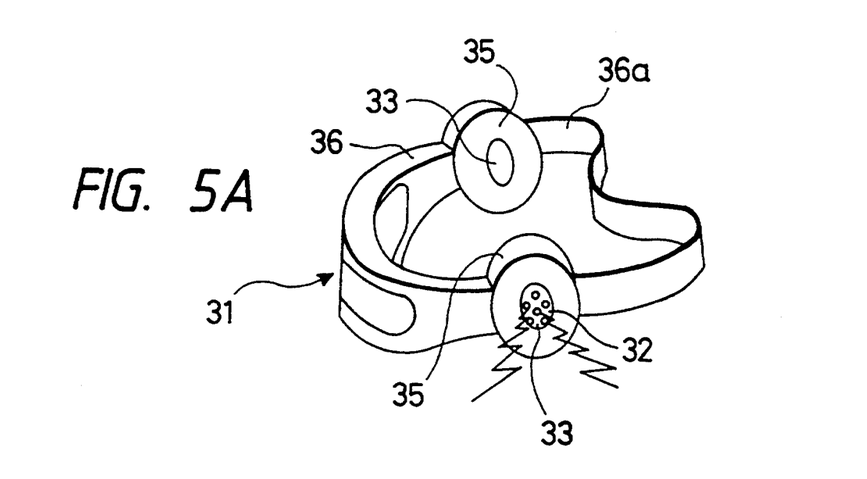
FIGS. 5A and 5B are perspective views showing the appearance of the image observation device of the present invention and an AV instrument used in combination with the device, respectively.
Figure 5B:
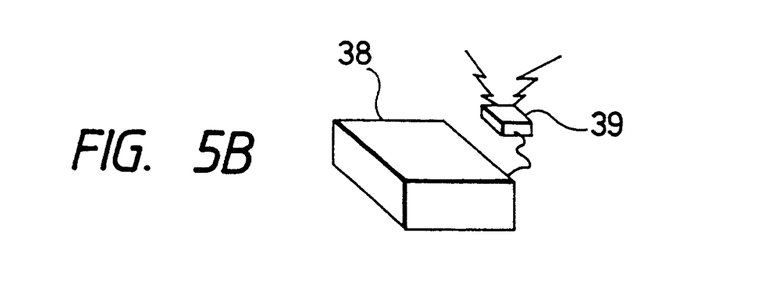
Figure 6:
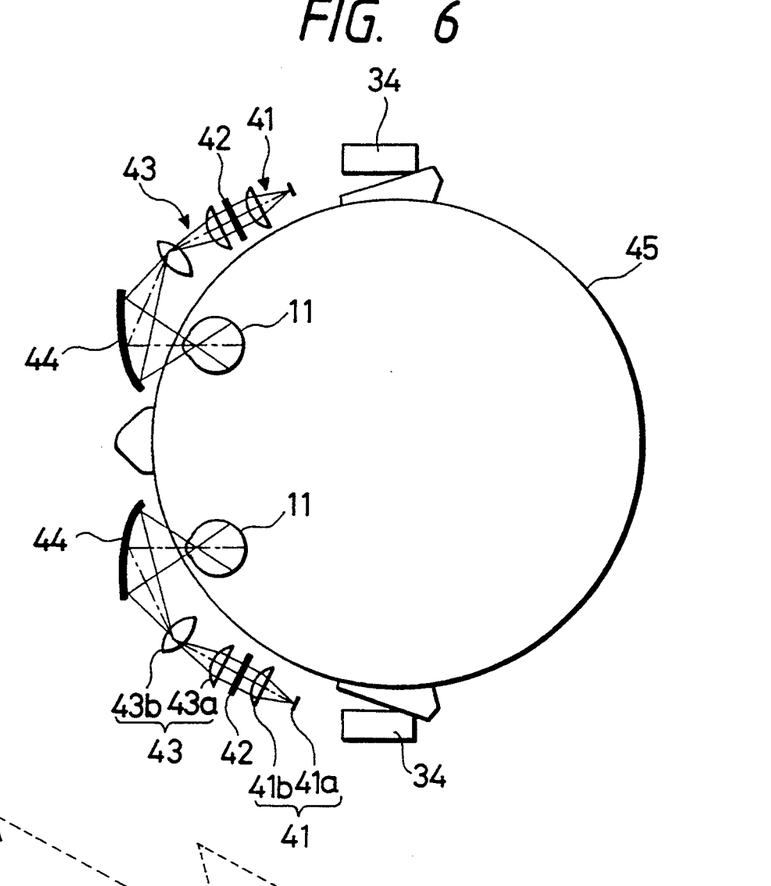
FIG. 6 is a schematic plan view showing the optical system of the image observation device according to a first embodiment of the present invention.
Figure 7:
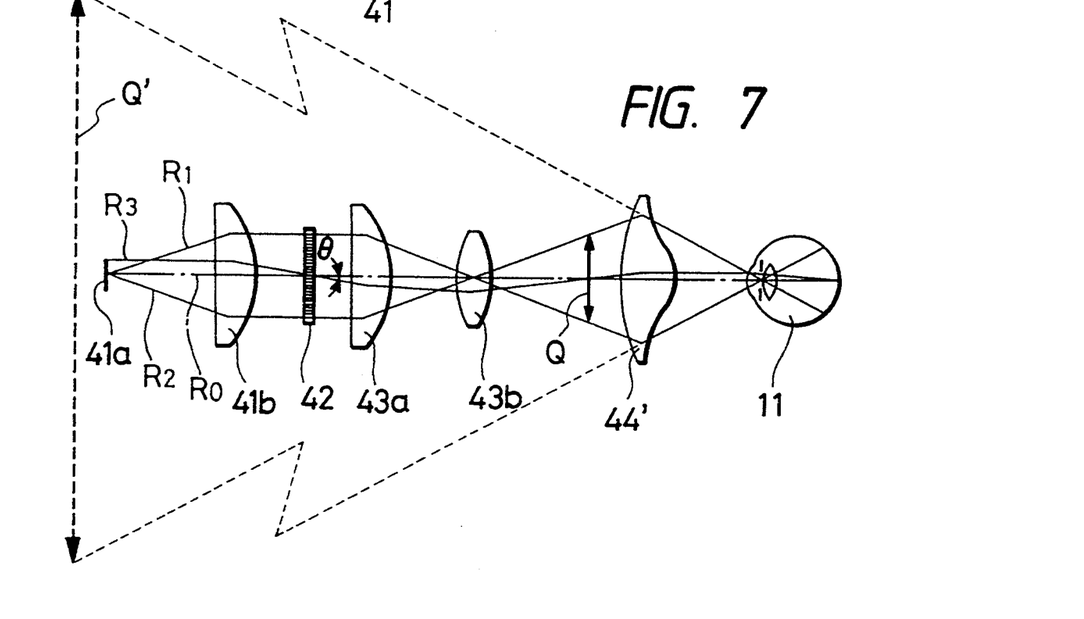
FIG. 7 is a view showing the optical system of FIG. 6 in a straight line.

FIGS. 5A to 8 show a first embodiment of the present invention. The image observation device of this embodiment, as shown in FIG. 5A, is composed of supporting means 36 including goggles 31 housing an optical system; ear pads 35 each incorporating a light-receiving section 32, a loudspeaker 33, and a signal processing circuit 34; and a headband 36a for mounting these components on the head of the user. In FIG. 5B, reference numeral 38 represents a video cassette recorder (VCR), and 39 represents a light transmitter for generating a video signal as a light modulating signal. The optical system housed in the goggles 31, as shown in FIGS. 6 and 7, is equipped with a backlight source 41 composed of a light-emitting element 41a and a collimator lens 41b; a two-dimensional display element 42 of liquid crystal display (LCD) type; a relay optical system 43 composed of a field lens 43a and an imaging lens 43b; and an aspherical concave mirror (eyepiece optical system) 44. Reference numeral 45 designates the head of the user. In FIG. 7, the aspherical reflecting mirror 44 is replaced with an aspherical lens 44' to show the optical system whose path is extended in a line.

Figure 8:
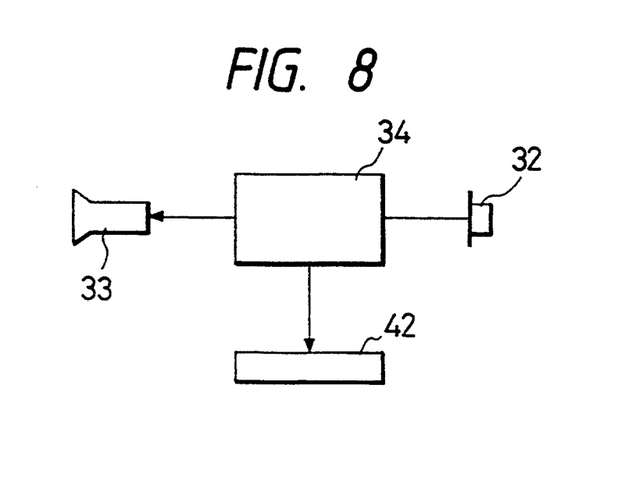
FIG. 8 is a schematic view showing the arrangement of a signal processing system incorporated in the image observation device.

Next, reference is made to the function of the image observation device with the above arrangement. The video signal reproduced by the VCR 38 is delivered from the light transmitter 39 as a light modulating signal, which is received by the light-receiving section 32 of the image observation device, and the signal processing circuit 34 is supplied with the video signal. In the signal processing circuit 34, the video signal is separated into a picture signal and an aural signal, which as shown in FIG. 8, are fed to the two-dimensional display element 42 and the loudspeaker 33, respectively. The two-dimensional display element 42 is irradiated with a beam of nearly parallel rays from its back surface by the backlight source 41 to form a two-dimensional image. Subsequently, the relay optical system 43 projects the real image of the two-dimensional image as a spatial image Q in front of the aspherical concave mirror 44. The real image is magnified and further projected as a virtual image Q' in space in front of the eye 11 by the concave mirror 44. The position where the virtual image is projected is adjusted to the diopter of the eye 11, and this adjustment is suitably made to observe the magnified picture of the two-dimensional image displayed on the two-dimensional display element 42.

The chief function of the imaging lens 43b is to project the real image of the two-dimensional display element 42 in front of the aspherical concave mirror 44. To obtain a good image from the two-dimensional display element of LCD type, the backlight source 41 irradiates the display element 42 from its rear surface with a beam of nearly parallel rays. That is, the collimator lens 41b projects the image of the light-emitting element 41a at an infinitely distant point. The field lens 43a relays the image of the light-emitting element 41a produced at the infinitely distant point, as the real image, to the neighborhood of the imaging lens 43b. In this way, the light beam at the imaging lens 43b is stopped down, and not only is the imaging lens 43b reduced to a small size, but the production of aberration of the imaging lens 43b comes to be easily suppressed. A ray traversing the centers of the light-emitting element 41a and the two-dimensional display element 42 is now referred to as an optical axis R0. The imaging lens 43b is decentered from the optical axis R0 toward the face of the user in the direction normal to the optical axis R0. Thus, the optical axis R0 is subjected to the action of the imaging lens 43b, and as shown in FIG. 6, is bent along his face.

The arrangement of the first embodiment dispenses with a mechanical stop for restricting the NA of the relay optical system 43, and this NA depends upon the extent of the light-emitting part of the light-emitting element 41a. Referring now to FIG. 7, this function is explained. FIG. 7 shows the replacement of the optical system depicted in FIG. 6 by a non-decentering refracting optical system having a paraxially equivalent function. In this diagram, like numbers are labeled to the corresponding optical elements. However the aspherical concave mirror 44 is shown as an aspherical lens 44' for the convenience of explanation. Reference symbols R1 and R2 represent principal rays, and R3 represents an on-axis marginal ray. An angle $\theta$ at which the marginal ray R3 emerges from the two-dimensional element 42 corresponds to the NA of incidence of the relay optical system 43. It is seen from the figure that the magnitude of the NA depends upon the beam diameter of light emitted from the light-emitting element 41a. Hence, the first embodiment does not include the aperture stop, and the light-emitting element 41a itself serves as the aperture stop.

As mentioned above, the real image of the light-emitting element 41a is once formed adjacent to the imaging lens 43b, and is then projected within the eyeball 11 by the aspherical concave mirror 44. This projected image is the exit pupil. It is desirable that the projected image, as has been described using FIGS. 3 and 4, is situated at the pupil I or the central point of rotation P of the eyeball 11, or between both. Because the image of the backlight source 41 functioning as the substantial aperture stop is projected at the infinitely distant point by the collimator lens 41b, the relay optical system 43 comes to a telecentric optical system on the object side. The first embodiment is provided with the function that the position of the two-dimensional display element 42 is shifted along the optical axis for adjustment so that the position of the virtual image created by the aspherical concave mirror 44 is adjusted to the diopter of the eye 11 and is adequately located. In this case, since the relay optical system 43 is the telecentric optical system, the adjustment does not give rise to a fluctuation in magnification. Although when the sizes of the images observed with the eyes are different, the images are very hard to view, the first embodiment is designed so that even when the diopters of the eyes are different, the images of the same size can be observed.

In order to reproject the image of the light-emitting element 41a thus produced adjacent to the imaging lens 43b, namely the pupil image, within the eyeball by the aspherical concave mirror 44, it is required that the focal length of the concave mirror 44 is 100 mm or less. The excess of this value remarkably increases the distances between the imaging lens 43b and the aspherical concave mirror 44 and between the aspherical concave mirror 44 and the eye 11, with the result being a large-sized optical system. Conversely, below 10 mm, there is the problem that the aberration of the aspherical concave mirror 44 becomes larger. The focal length of the concave mirror 44 is determined in view of these optical properties, pupil position, and field angle of the imaging lens 43b, and is desired to be 15–40 mm.

Figure 9:
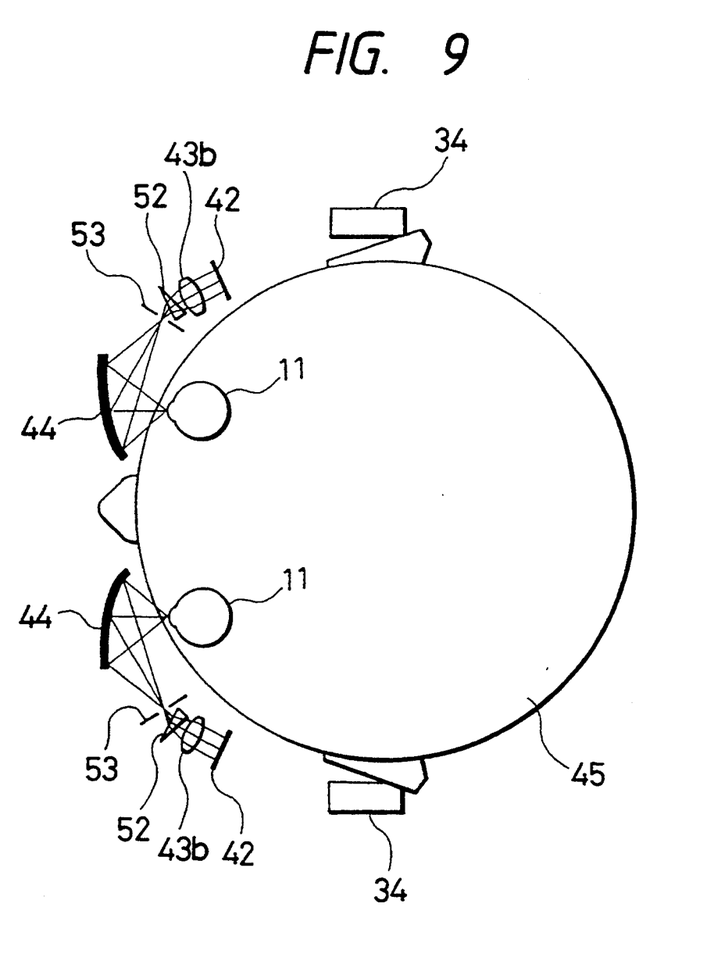
FIG. 9 is a schematic plan view showing the optical system of the image observation device according to a second embodiment of the present invention.

In accordance with FIG. 9, a second embodiment of the present invention is explained. Since this embodiment is fundamentally the same as the first embodiment, only different features are described below. Although the first embodiment employs an LCD type two-dimensional display element 42, the second embodiment uses a two-dimensional display element 42 of self-emission type in which, for example, minute light-emitting diodes are arrayed in a matrix, thus doing away with the need for the illuminating optical system. Furthermore, the field lens 43a of the relay optical system 43 in the first embodiment is removed, and only the imaging lens 43b is disposed. Additionally, a wedge-shaped prism 52 is used to bend the optical axis, and as such the imaging lens 43b is not decentered.

In the second embodiment, the use of the self-emission type two-dimensional display element 42 described above leads to an extremely large NA of the light beam emitted from the display element. Consequently, this arrangement requires an aperture stop 53 for restricting moderately the light beam. By the arrangement in which the aperture stop 53 is disposed at the image focal point of the imaging lens 43b, individual principal rays emitted from the two-dimensional display element 42 become parallel to one another. Specifically, the telecentric optical system is secured on the object side. It is, therefore, the same as in the first embodiment that when the position of the two-dimensional display element 42 is adjusted to the diopter of the eye 11, a fluctuation in magnification is not caused.

Figure 10:
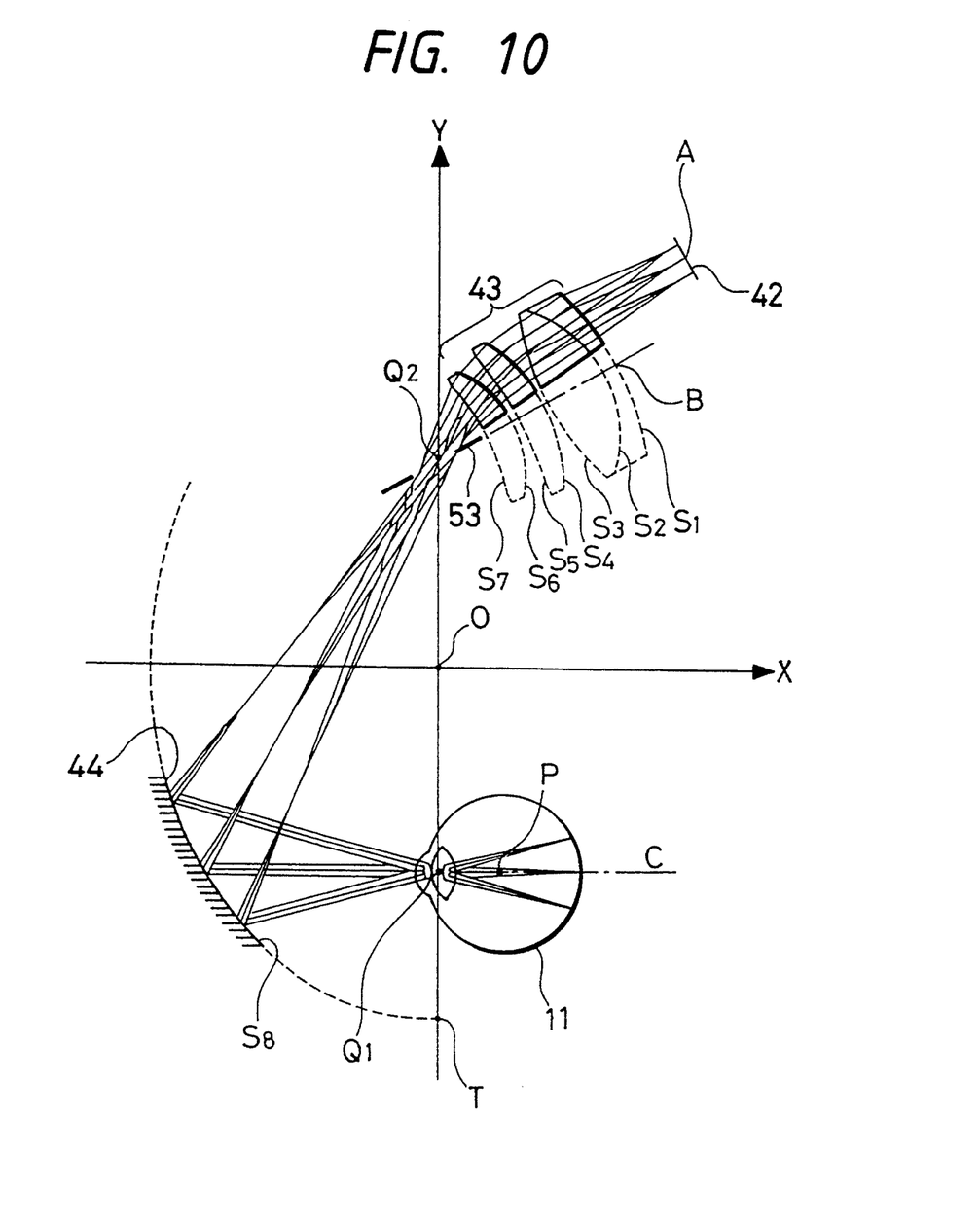
FIG. 10 is a schematic plan view showing the optical system of the image observation device according to a third embodiment of the present invention.

Referring to FIG. 10, a third embodiment of the present invention is explained. Since this embodiment is fundamentally the same as the second embodiment, only different features are described below. In this diagram, reference symbols S1, S2, S3, ..., and S7 denote the lens surfaces of the relay optical system 43; A denotes the point of intersection of the optical axis with the two-dimensional display element 42; B the vertex of a first surface S1 of the relay optical system 43; and C the eye axis. A spheroidal concave mirror (hereinafter referred to as a spheroidal mirror) is used as the concave mirror 44. Reference symbol T designates the vertex of the spheroidal mirror 44. A straight line connecting the vertex B with a focal point Q2 is the central axis of rotation of the relay optical system 43. Here, the central point between the focal points Q1 and Q2 is taken as an origin O; a line connecting the focal points Q1 and Q2 as a Y axis; and an axis traversing the origin O and intersecting normal to the Y axis as an X axis. The spheroidal mirror 44 is supported directly before the eye 11 by supporting means not shown.

A detailed description is made of the position of the supporting means. The focal point Q1 which is one of two elliptic focal points of the spheroidal mirror 44 is placed at the pupil of the eye 11. The supporting means supports the spheroidal mirror 44 in such a way that the straight line connecting the two elliptic focal points Q1 and Q2 of the spheroidal mirror 44 is practically perpendicular to an eye axis C where the eye 11 is directed toward the front. The spheroidal mirror 44 thus supported minimizes the protrusion from the face of the user and is capable of bending properly the optical axis according to the contour of his face. In this case, the focal points Q1 and Q2 of the spheroidal mirror 44 lie on the major axis of the ellipse, and it is desirable that the distance between them is 35–150 mm. If the distance is less than 35 mm, the bending power of the spheroidal mirror 44 will excessively increase, with the result that the image of the two-dimensional display element 42 is subject to strong coma. Beyond 150 mm, it becomes difficult to bend the optical axis along his face. In the third embodiment, the distance is set to nearly 60 mm, as shown in the lens data which will be stated later. For the ellipticity (major axis length/minor axis length) of the spheroidal mirror 44, if the value is extremely small, the focal lengths of the spheroidal mirror 44 must be made longer to ensure the distance of 35–150 mm between the focal points Q1 and Q2, with the result being a considerable protrusion from the face. Conversely, if the value is large to excess, the image of the two-dimensional display element 42 produced by the spheroidal mirror 44 will suffer from large aberration. In view of these disadvantages, the ellipticity should be 1.1–2.0, preferably 1.2–1.5, and as such the ellipticity in the third embodiment is nearly 1.22.

Calculating the paraxial focal length of the spheroidal mirror 44 available under the conditions of the distance of 35–150 mm between the focal points Q1 and Q2 and the ellipticity of 1.1–2.0, the result is about 17.5–100 mm. When the ellipticity is 1.1–1.5 in particular, the distance is about 17.5–81.4 mm.

In the third embodiment, an aperture stop 53 is considerably tilted, in view of aberration caused by tilting the spheroidal mirror 44 with respect to the optical axis, so that the image of the aperture stop formed by reflection from the spheroidal mirror 44, namely the exit pupil, is substantially normal to the eye axis C. Hence, for the aperture shape of the aperture stop 53, an ellipse is preferable to a circle. The center of the aperture stop 53 coincides with the elliptic focal point Q2. Furthermore, the two focal points Q1 and Q2 are conjugate with each other. Because there is no spherical aberration, such an arrangement makes it possible to project a clear exit pupil on the pupil of the eye 11, without bringing spherical aberration to the exit pupil even in the case of a large field angle.

The relay optical system 43 is held so that its object focal point coincides with the center of the aperture stop 53, and thus becomes telecentric on the image side. Consequently, even when the two-dimensional display element 42 is adjusted to the diopter of the eye 11 along the optical axis, a fluctuation in magnification is not produced. This optical system is greatly decentered from the optical axis, which fact brings about not only the function of bending the optical axis along the face of the user not shown, but the function of correction for aberration. Specifically, the placement of the spheroidal mirror 44 greatly decentered from the optical axis will yield aberration having properties different for the coaxial optical system usually used, such as the tilt of the image surface relative to the optical axis. To eliminate the aberration, although there is the method of making correction by using a special optical element, such as a cylindrical lens or a wedge prism, the third embodiment is capable of largely decentering the relay optical system 43 laterally from the optical axis. Three beams of light emitted from the central point and two marginal points of the two-dimensional display element 42 are shown between the aperture stop 53 and the spheroidal mirror 44. These collecting points are the images of three points on the two-dimensional display element 42. From the images of the three points also, it is seen that the spatial image created here is tilted with respect to the optical axis. This tilt offsets the aberration caused by that of the image surface of the spheroidal mirror 44, and the image reflected from the spheroidal mirror 44 is sharply reformed as the virtual image at an infinitely distant point.

The X–Y coordinates of respective points are as follows:

| | (X, Y) |
|---|---|
| A: | (34.7637, 57.3652) |

-continued

| | (X, Y) |
|---|---|
| B: | (25.3640, 42.3437) |
| $Q_1$: | (0.0000, 28.2843) |
| $Q_2$: | (0.0000, −28.2843) |
| T: | (0.0000, −43.9898) |

The lens data of the relay optical system in the third embodiment is given in Table 1. In this table, ri is the radius of curvature of each lens surface, di is the surface space, and ni is the refractive index.

TABLE 1

| | ri | di | ni | Remarks |
|---|---|---|---|---|
| $S_1$ | 34.0000 | | | Relay optical system |
| | | 2.00000 | 1.784718 | |
| $S_2$ | 17.3000 | | | Relay optical system |
| | | 9.0000 | 1.516330 | |
| $S_3$ | −37.5000 | | | Relay optical system |
| | | 1.0000 | | |
| $S_4$ | 24.0000 | | | Relay optical system |
| | | 4.0000 | 1.784718 | |
| $S_5$ | 60.0000 | | | Relay optical system |
| | | 1.0000 | | |
| $S_6$ | 15.0000 | | | Relay optical system |
| | | 4.0000 | 1.784718 | |
| $S_7$ | 30.0000 | | | Relay optical system |
| | | 8.0000 | | |
| 53 | ∞ | | | Aperture stop |

The aspherical equation of the spheroidal mirror 44 is given by $$Y = \frac{C R^2}{1 + \sqrt{1 - (K + 1) C^2 R^2}} - 48.9898$$

where C=0.03061862 and K=−0.333333. C is the curvature of the reference surface of the spheroidal mirror 44, and R is the distance from the Y axis to the spherical surface, which is the spheroid with the Y axis as the rotating axis.

In each embodiment, display means, such as a liquid crystal display, a light-emitting diode, or a plasma display, is disposed substantially normal to the optical axis. This display means is such that emission luminance varies with the direction of its display surface. In most cases, the emission luminance where the optical axis inclines with respect to the display surface is low compared with that where it is normal thereto. Thus, in order to obtain a bright image for observation, it is desirable that the optical axis is perpendicular.

What is claimed is:

1. An image observation device supportable on a head of a user comprising:
    a first observation optical system including:
        two-dimensional image display means for displaying a two-dimensional image,
        a relay optical system for forming in space a real image of an image displayed on said two-dimensional image display means, said relay optical system having an optical axis and including one of a refractive lens decentered from said optical axis and a wedge-shaped prism, for bending said optical axis extended thereto from said two-dimensional image display means along a curve of said head of said user, and
        a concave reflecting mirror for forming a magnified virtual image of said real image and for bending said optical axis extended thereto from said relay optical system, said concave reflecting mirror bending said optical axis in a same direction as said relay optical system bends said optical axis extended thereto, for orienting said optical axis toward an eye of said user, and
    supporting means for supporting said concave reflecting mirror directly before said eye of said user.

2. An image observation device according to claim 1, wherein said concave reflecting mirror is an aspherical reflecting mirror having a concave surface which is directed toward said eye of said user.

3. An image observation device according to claim 1, wherein said relay optical system is a telecentric optical system on an object side.

4. An image observation device according to claim 1, wherein said supporting means locates an exit pupil of said first observation optical system at one of positions including at a position adjacent to a central point of rotation of said eye and at a position located between said central point of rotation of said eye and a pupil of said eye.

5. An image observation device according to claim 1, wherein:
    said concave reflecting mirror is an approximate spheroidal mirror; and
    said supporting means locates one of two focal points of said concave reflecting mirror at one of positions including at a position adjacent to a central point of rotation of said eye and at a position between said central point of rotation of said eye and a pupil of said eye.

6. An image observation device according to claim 1, wherein said relay optical system further comprises an aperture stop disposed tilted with respect to said optical axis and having an elliptic aperture.

7. An image observation device according to claim 1, wherein:
    said two-dimensional image display means is disposed substantially normal to said optical axis; and
    said refractive lens is decentered so that said real image in space is formed tilted with respect to said optical axis.

8. An image observation device according to claim 1, further comprising a second observation optical system forming a symmetrical structure in combination with said first observation optical system according to claim 1, for enabling a stereoscopic image to be observed, wherein said second observation optical system is arranged for a second eye of said user.

9. An image observation device comprising:
    two-dimensional image display means for displaying a two-dimensional image;
    a relay optical system forming in space a real image of an image displayed on said two-dimensional image display means;
    an eyepiece optical system forming a magnified virtual image of said real image and bending an optical axis extended thereto from said relay optical system, said eyepiece optical system including an aspherical reflecting mirror having a concave surface directed toward an eye of a user;
    an aperture stop for restricting a beam diameter of light emitted from said two-dimensional image display means; and
    supporting means for supporting said eyepiece optical system directly before said eye of said user and for supporting said aperture stop so that a real image of said aperture stop produced by an optical system between said aperture stop and said eye is located at one of positions including at a position adjacent to a pupil of said eye, at a position adjacent to a central point of rotation of said eye, and at a position located between said pupil and said central point of rotation of said eye.

10. An image observation device according to claim 9, wherein:
said two-dimensional image display means is a self-emission type display element;
said relay optical system includes an imaging lens and a wedge-shaped prism; and
said aperture stop is disposed at an object focal point of said imaging lens.

11. An image observation device according to claim 10, wherein said self-emission type display element is moveable along said optical axis.

12. An image observation device according to claim 9, wherein:
said relay optical system includes an imaging lens decentered from said optical axis; and
said aperture stop inclines with respect to said optical axis.

13. An image observation device comprising:
two-dimensional image display means for displaying a two-dimensional image;
a relay optical system forming in space a real image of an image displayed on said two-dimensional image display means;
an eyepiece optical system forming a magnified virtual image of said real image and bending an optical axis extended thereto from said relay optical system, said eyepiece optical system including an approximate spheroidal reflecting mirror having a concave surface directed toward an eye of a user and having two focal points, one of said two focal points being located at one of positions including at a position adjacent to a pupil of said eye, at a position adjacent to a central point of rotation of said eye, and at a position located between these positions; and
supporting means for supporting said eyepiece optical system directly before said eye of said user.

14. An image observation device according to claim 13, wherein a distance between said two focal points of said spheroidal reflecting mirror is 35-150 mm and ellipticity is 1.1-2.0.

15. An image observation device comprising:
two-dimensional image display means for displaying a two-dimensional image, said two-dimensional image display means including:
a light source,
a collimator lens for changing light from said light source to a beam of substantially parallel rays, and
a liquid crystal display panel,
a relay optical system forming in space a real image of an image displayed on said liquid crystal display panel, said relay optical system including:
a field lens, and
an imaging lens decentered from an optical axis extending thereto from said two-dimensional image display means;
an eyepiece optical system forming a magnified virtual image of said real image and bending an optical axis extended thereto from said relay optical system, said eyepiece optical system including an aspherical reflecting mirror having a concave surface directed toward an eye of a user; and
supporting means for supporting said eyepiece optical system directly before an eye of a user.

16. An image observation device according to claim 15, wherein said liquid crystal display panel is moveable along said optical axis.

17. An image observation device comprising:
two-dimensional image display means for displaying a two-dimensional image;
a relay optical system forming in space a real image of an image displayed on said two-dimensional image display means;
an eyepiece optical system forming a magnified virtual image of said real image and bending an optical axis extended thereto from said relay optical system, said eyepiece optical system including an aspherical reflecting mirror having a focal length of 15-40 mm and a concave surface directed toward an eye of a user; and
supporting means for supporting said eyepiece optical system directly before said eye of said user.

* * * * *